Dec. 12, 1961   G. A. KENDALL   3,012,770
SELF CENTERING LIQUID SPRING DAMPER
Filed Nov. 18, 1959   2 Sheets-Sheet 2
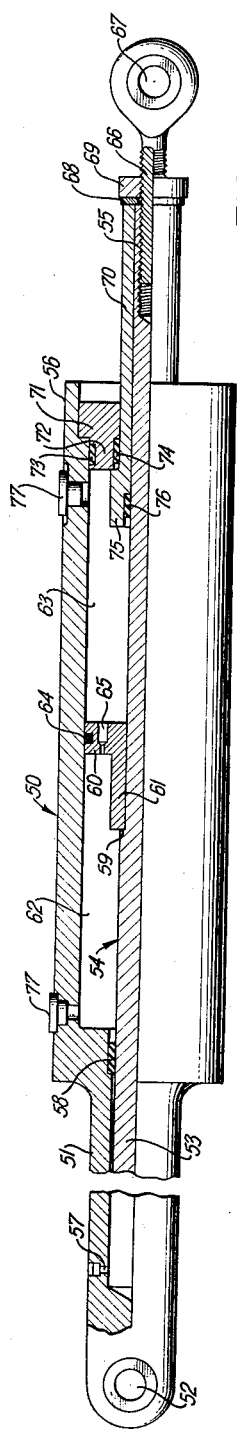
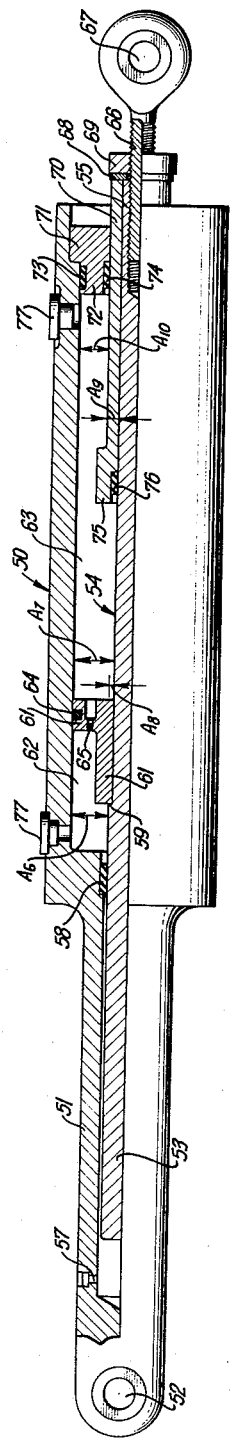
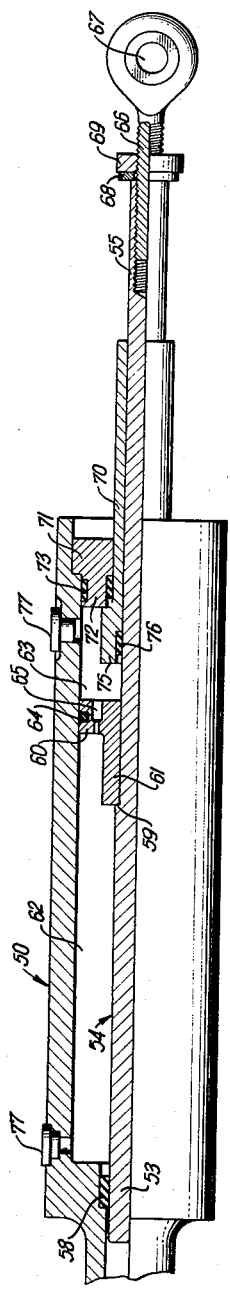
INVENTOR.
GILES A. KENDALL
BY
R. E. Geanque
ATTORNEY.

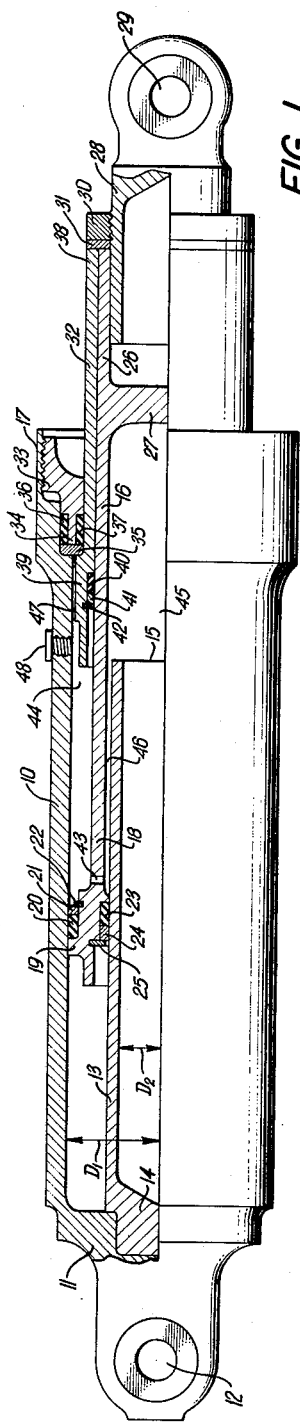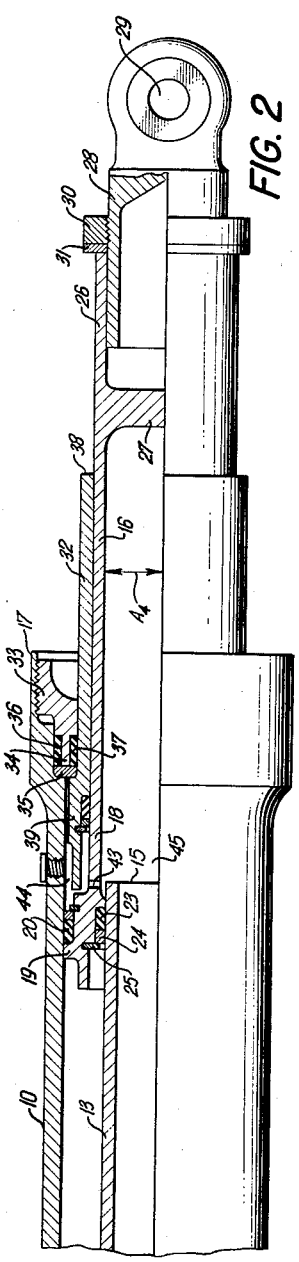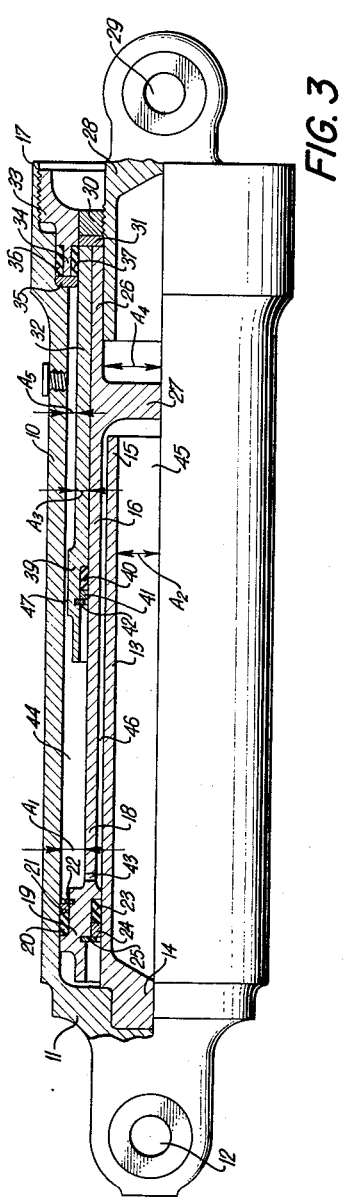

United States Patent Office 3,012,770
Patented Dec. 12, 1961

3,012,770
SELF CENTERING LIQUID SPRING DAMPER
Giles A. Kendall, Van Nuys, Calif., assignor to Menasco Manufacturing Company, Burbank, Calif., a corporation of California
Filed Nov. 18, 1959, Ser. No. 853,762
12 Claims. (Cl. 267—64)

This invention relates to self centering liquid spring damper and more particularly to a device which utilizes a compressible liquid to return a body to center position and damp the displacement of the body from its centered position.

Self centering devices can be utilized to position a body in a selected position and will resist movement of the body from the position within a finite range of applied loads. Also, such devices provide means of returning the body to its centered position after displacement and provides means for damping the motion of displacement.

The present invention has the advantage over mechanical or pneumatically centered devices because of simplicity in operation and service. All modifications of the invention utilize a compressible liquid, such as silicone fluid, which is pressurized to a value required to provide a desired centering force. Also, all modifications include an adapter which is slidable on the main piston rod. In the centered position, the adapter is forced outward against the end of the cylinder and the piston rod is forced into engagement with the end of the adapter. Upon the application of a force in either direction, the total volume of the compressible liquid is decreased to obtain the spring force and the liquid is forced through an orifice to obtain a damping action.

It is therefore an object of the present invention to provide a self centering liquid spring damper which utilizes a compressible liquid to provide a centering force and to provide a damping action.

Another object of the invention is to provide a self centering liquid spring which utilizes an adapter movable on the main piston rod to vary the volume of the compressible fluid and produce a spring resistance force opposed to movement of the main piston rod in either direction.

A further object of the present innvention is to provide a self centering device utilizing a compressible liquid to obtain a spring action and damping action upon relative movement of the member to which the device is secured.

These, and other objects of the invention not specifically set forth above, will become apparent from the accompanying description and drawings in which:

FIGURE 1 is a partial sectional view of one form of the invention showing the piston head centrally located in the cylinder;

FIGURE 2 is a sectional view similar to FIGURE 1 showing the piston head at one end of the cylinder after movement of the piston rod out of the cylinder;

FIGURE 3 is a sectional view similar to FIGURE 1 showing the piston head at the other end of the cylinder after movement of the piston rod into the cylinder;

FIGURE 4 is a partial sectional view of another form of the invention showing the piston head centrally located, this modification having a greater length for a given stroke;

FIGURE 5 is a sectional view similar to FIGURE 4 showing the piston head at one end of the cylinder after movement of the rod into the cylinder, and FIGURE 6 is a sectional view similar to FIGURE 4 showing the piston head at the other end of the cylinder after movement of the piston rod out of the cylinder.

Referring to the form of the invention illustrated in FIGURES 1 through 3, a cylinder 10 has an extension member 11 which closes the end of the cylinder and contains an opening 12. Any suitable linkage (not shown) can be secured in opening 12 in order to secure the cylinder to one of two relatively movable parts or bodies. A cylinder shell 13 has an end member 14 rigidly secured to extension member 11 in order to maintain shell 13 coaxially positioned within cylinder 10. The opposite end 15 of shell 13 terminates within cylinder 10 since the shell is shorter than the cylinder.

A piston rod 16 extends through end 17 of cylinder 10 and end 18 of the piston rod surrounds end 15 of shell 13. An irregularly shaped piston head 19 is carried by end 18 of the piston rod and has a cut-away portion containing seal assembly 20, spacer 21 and locking ring 22. A second cut-away portion also contains a sealing assembly 23, spacer 24 and locking ring 25. The other end 26 of piston rod 16 contains a transverse strengthening partition 27 and a cylindrical fitting member 28 is inserted into end 26 and rigidly secured thereto. A fitting opening 29 is contained in member 28 to receive suitable linkage (not shown) connected to another movable part or body which moves relatively to the body or part connected at opening 12. The member 28 has threaded thereto a circular nut 30 which is separated from the end 26 of piston rod 16 by a washer 31. Both nut 30 and washer 31 are larger in diameter than piston rod 16 (see FIGURE 2) in order to provide a stop, as later explained.

An adapter cylinder or sleeve 32 surrounds a portion of the piston rod 16 and extends through end 17 of cylinder 10. A nut 33 is threaded into end 17 of cylinder 10 until projection 34 engages a spacer 35 located in a cutout of cylinder 10. A seal 36 is located between cylinder 10 and projection 34 and a seal 37 is located between adapter 32 and projection 34. Any suitable means (not shown) can be utilized to lock nut 33 is position. The outer circumference of end 38 of adapter 32 is the same as nut 30 and washer 31 so that end 38 can serve as a stop for the piston rod 16. The other end 39 of adapter 32 comprises an irregular adapter head of enlarged diameter which serves as a stop to engage the spacer 35 and retain the adapter in cylinder 10. A sealing assembly 40 and spacer 41 are retained between adapter head 39 and piston rod 16 by locking ring 42. Also, end 18 of the piston rod contains an orifice 43 which communicates the space 44 exteriorly of the piston rod with the continuous space 45 within the piston rod 16 and shell 13 through the passage 46 between shell 13 and rod 16. A clearance 47 exists between adapter head 39 and cylinder 10 so that fluid can pass around the head and the effective area of the adapter is determined by the thickness of the adapter sleeve.

Prior to operation, the spaces 44 and 45 are filled with a compressible liquid, such as silicone fluid, through the plug 48. The pressure in the spaces is raised to a value required to provide a desired centering force. The fluid area at the piston head 19 is larger than the area at partition 27 so that a resultant inward force is developed on piston rod 16 by head 19. However, this resultant force is less than the outward force developed on the area of adapter 32. Thus, the fluid pressure on adapter sleeve 32 will hold the adapter fully extended and the lesser resultant inward force on piston rod 16 will hold washer 31 in engagement with end 38 of the adapter. Therefore, the piston rod and adapter will assume the position of FIGURE 1 when fluid is introduced to the cylinder 10. In other words, if dimension $A_1$ represents the area of head 19 exteriorly of piston rod and dimension $A_2$ represents the area of shell 13, then the difference in these areas produces the resultant force to move piston rod inwardly so that washer 31 engages the end of the adapter 32. Also, if dimension $A_3$ represents the area of the adapter cylinder 32, then $A_3$ is greater than $A_1$ minus $A_2$ so that the adapter will be held extended with head 39 engaging nut 33, as in FIGURE 1. It is understood that the internal area of the piston rod represented by dimension $A_4$ includes an outer area which is also common to the piston head 19 so that only area $A_3$ is involved in the force balance for centering purposes.

Thereafter, the device will have a self centering and damping action when the load applied by the parts or bodies secured at fitting opening 12 and 29, exceeds a value determined by the initial pressure of the liquid. For instance, if the applied load is in the directon to extend the piston rod 16 (see FIGURE 2) the volume of space 44 is reduced at a greater rate than the volume of space 45 increases. The reduced volume of space 44 is determined by the product of area $A_1$ times the stroke from the centered position while the increased volume of space 45 equals the area $A_4$ times the stroke so that a net reduction in volume results. Thus, the liquid becomes compressed and develops a spring pressure to return the piston rod to the centered position of FIGURE 1. At the same time, fluid will flow from space 44 to space 45 through orifice 43 to provide a damping action on extension of the piston rod, and the reverse damping flow through the orifice will result during return to centered position of the parts.

If the applied load is in the direction to move the piston rod into the cylinder (see FIGURE 3), the increase in the volume of space 44 is less than the reduction in volume of space 45. The reduced volume of space 45 equals the product of area $A_4$ times the stroke whereas the increased volume in space 44 equals the area between the adapter and cylinder, represented by the dimension $A_5$, times the stroke from centered position. Because of the small width of area $A_5$, the volume increase in space 44 is less than the reduction of volume in space 45. Thus, the liquid becomes compressed and develops a spring force to return piston head 39 to its self centering position. Of course, the flow through orifice 43 during the inward and return stroke of the piston rod serves to dampen these movements. Because of the overlap of the piston rod, adapter and inner shell, this device has a short overall length for a given stroke of combined tension and compression type liquid spring and can be utilized either in the horizontal or vertical position.

Another form of the invention is illustrated in FIGURES 4 through 6, and comprises a cylinder 50 which has a hollow extension 51 at one end terminating in a fitting opening 52. The extension 51 slidably receives end 53 of piston rod 54 and the other end 55 of the rod extends through end 56 of the cylinder 50. A breather port 57 is located in extension 51 to prevent entrapment of air during movement of rod 53 and the seal 58 is located between the rod and the extension.

The rod 54 contains a step 59 so that end 53 is of greater diameter than end 55. A piston head 60 has a leg 61 which abuts the step 59 and is rigidly secured to the smaller end 55 of the rod so that the head divides the interior of the cylinder into spaces 62 and 63. The piston head 60 contains an O-ring seal 64 adjacent to the cylinder and also contains an orifice 65 for transferring fluid from one side of the head to the other as spaces 62 and 63 vary in size during movement of the piston head. End 55 of the piston rod receives the threaded member 66 which contains a fitting opening 67. A washer 68 is held against end 55 by a nut 69 threaded onto member 66. Since both the washer and the nut are larger in diameter than end 55, these members serve as a stop, as later described.

An adapter sleeve 70 surrounds the piston rod 54 and slides through the nut 71 which closes end 56 of the cylinder 50. The nut 71 has a portion 72 carrying seals 73 and 74 to seal the nut respectively, with the cylinder 50 and the adapter 70. Any suitable means (not shown) can be utilized to lock nut 71 in position. One end 75 of the adapter comprises an enlarged adapter head sealed from piston rod 54 by seal 76 and the adapter head engages nut 71 when the adapter is fully extended out of cylinder 50. It is understood that two parts or bodies which are relatively movable with respect to each other are connected by suitable fittings (not shown) to openings 52 and 67 so that the self centering device can oppose such relative movement. Filling plugs 77 are provided to introduce compressible fluid into the cylinder 50 and the pressure of the fluid is such as will provide the desired initial resistance and centering force.

In operation, the components of the invention will assume the centered position illustrated in FIGURE 4 after the cylinder 50 is filled with fluid. In the self centered position, the head 75 of adapter 70 is held in engagement with nut 71 and the washer 68 on piston rod 54 is held in abutment with the end of the adapter by the resultant pressure on piston head 60. This resultant pressure arises because of the difference in area of the head presented to spaces 62 and 63 and this difference in area is equal to the area of the stepped portion 59. Since the area of the stepped portion 59 is less than the area of the adapter sleeve, the force developed by head 60 to move the piston rod inwardly is not sufficient to overcome the outward force of adapter 70. If dimension $A_6$ represents the area of head 60 opposite space 62 and dimension $A_7$ represents the area of head 60 opposite space 63, then dimension $A_8$ represents the difference in these areas. Also, if dimension $A_9$ represents the area of adapter 70, then it is apparent that area $A_9$ exceeds area $A_8$ to produce the self centering action.

When a load is applied by the attached bodies in a direction to move rod 54 into cylinder 50, components will assume positions, such as shown in FIGURE 5. The volume of space 62 will decrease by amount equal to area $A_6$ times the stroke from center position while the volume of space 63 will increase by an amount equal to area $A_{10}$ (area $A_7$ minus area $A_9$) times the stroke. Since the increase in space 63 is less than the decrease in space 62, compression of the liquid will result to produce a spring force to recenter the piston 60 after the load is removed or reduced. Because of the fluid flow through orifice 65 as the piston 60 moves to the left and then is returned to center position, movement of the piston in both directions is damped.

If a load is applied by the attached bodies in a direction to extend rod 54 out of cylinder 50, the components will assume positions, such as shown in FIGURE 6. Since the adapter 70 will remain stationary, the volume of space 62 will increase by the product of area $A_6$ times the stroke while the volume of space 63 will decrease by the product of the area $A_7$ times the stroke. Because the area $A_7$ is larger than the area $A_6$, there will be compression of the liquid which will produce a spring force to recenter the piston 60 after the load is removed or reduced. Also, flow of fluid through orifice 65 during both displacement and recentering motion serves to damp hese motions. This second form of the invention requires more space than the first described form for a given stroke but either form can be used in horizontal or vertical position. Basically, the two forms differ in that in the second form, the two spaces are axially displaced while in the first form, the two spaces are substantially radially displaced.

By the present invention, there is provided a liquid spring which is self centering and in which movements are damped by flow of fluid from one space to another through an orifice. The amount of damping can be varied by varying the orifice size and if the orifice is large enough, no substantial damping would result. Also, since the spring action depends on reduction in fluid volume as the piston rod is displaced from its self centering position, the various dimensions of the components of the two forms of the invention can be modified to provide the same spring force in both directions by reducing the volume the same amount in each direction or different forces in opposite directions by reducing the volume by different amounts in opposite directions. Of course, the rigidity of the liquid spring will depend upon the rate at which the volume reduces upon movement from the centered position. The two forms of the invention are particularly useful in supporting airplanes on the ground but have many other applications. Various other modifications of the invention are contemplated by those skilled in the art without departing from the spirit and scope of the invention as hereafter defined by the appended claims.

What is claimed is:

1. A self centering liquid spring comprising a cylinder containing a compressible liquid under pressure, means movable within said cylinder comprising a piston rod extending through at least one end of said cylinder and having a piston head located within said cylinder, adapter means movable relative to said piston rod within said cylinder and outwardly through said one end of said cylinder, a stop on said adapter means for limiting the movement of said adapter means outwardly of said cylinder, said movable means dividing the interior of said cylinder into first and second fluid spaces, passage means for connecting said spaces together, and stop means carried by said piston rod and engaging said adapter means for resisting the inward movement of said piston rod, the areas of said movable means and the area of said adapter means subject to the fluid pressure within said cylinder causing said piston head to assume a predetermined centered position with said adapter means fully extended and said stop means in engagement with said adapter means and causing reduction in the total fluid volume upon movement of said piston head in either direction away from said predetermined position so that a spring force is developed to return said piston head.

2. A self centering liquid spring comprising a cylinder containing a compressible liquid under pressure, means movable within said cylinder comprising a piston rod extending through one end of said cylinder and having a piston head located within said cylinder, an adapter sleeve surrounding said piston rod and extending through said one end of said cylinder, the movable means dividing the interior of said cylinder into first and second fluid spaces with the first of said spaces located between said piston head and said one end of said cylinder, opening means in said movable means for connecting said spaces together, the areas of said movable means and said adapter sleeve subjected to the fluid pressure in said spaces being so constructed and arranged as to normally provide a resultant inward force on said movable means less than the outward force on said adapter sleeve resulting from the fluid pressure in said one space, an adapter stop for limiting the outward movement of said adapter sleeve and engaging said sleeve in a centered position of said movable means, and stop means carried by said piston rod and engaging the outer end of adapter sleeve in said centered position of said piston head, movement of said piston head and rod in either direction from said centered position causing a reduction in total volume of said fluid spaces.

3. A self centering liquid spring as defined in claim 2 wherein the effective areas of said movable means cause reduction of volume of said first space at a greater rate than increase in the volume of said second space upon outward movement of said piston rod, said areas of said movable means and the effective area of said sleeve causing reduction in volume of said second space at a greater rate than increase in volume of said first space upon inward movement of said piston rod and adapter sleeve.

4. A self centering liquid spring as defined in claim 3 wherein said opening means comprising a restricted orifice for restricting fluid flow from one of said spaces to the other space.

5. A self centering liquid spring as defined in claim 2 wherein said first and second fluid spaces are displaced axially from one another and on opposite sides of said piston head, the area of said piston head in communication with said first space being larger than the area of said piston head in communication with said second space, said opening means being located through said piston head.

6. A self centering liquid spring as defined in claim 2 having a hollow projection extending from the other end of said cylinder, said piston rod being hollow to receive said projection so that the interior of said piston rod and said projection defines said second space, said opening means passing through said piston rod.

7. A self centering liquid spring comprising a cylinder containing a compressible liquid under pressure, a piston rod located within said cylinder and containing a hollow compartment, said piston rod extending through one end of said cylinder and having a piston head located within the cylinder, a hollow circular shell extending from the other end of said cylinder and into said compartment in said piston rod, said compartment and the interior of said shell forming a first fluid space having a volume varying with movement of said piston rod, an adapter sleeve surrounding said piston rod and extending through said one end of said cylinder, a second space located between said piston head and said one end of said cylinder and exteriorly of said piston rod, opening means in said piston rod for connecting said two spaces together, a stop carried by said adapter sleeve for engaging said one end of said cylinder to limit the outward movement of said sleeve, and stop means carried by said piston rod for engaging the outer end of said adapter sleeve to resist the inward movement of said piston rod, the fluid pressure in said first space acting on said piston rod and in said second space acting on said piston head and on said adapter sleeve normally causing full extension of said adapter sleeve and centering of said piston head, movement of said piston head from its centered position in either direction causing a reduction of the volume of said fluid spaces to provide a centering spring force.

8. A self centering liquid spring as defined in claim 7 wherein said opening means comprising an orifice in said piston rod to damp the movement of said piston head from and towards its centered position.

9. A self centering liquid spring as defined in claim 7 wherein the effective area of said adapter sleeve moving inwardly into said cylinder with said piston rod causes increase in said second space at a lesser rate than reduction of said first space, said sleeve remaining stationary upon extending of said piston rod causing increase in said first space at a lesser rate than decrease in said second space.

10. A self centering liquid spring as defined in claim 1 wherein said piston rod has one end portion extending through said one end of said cylinder and another end portion of different diameter extending through the opposite end of said cylinder, said rod portions joining at a step portion and said piston head being secured to said piston rod at said step portion, said first and second spaces being located in said cylinder on opposite sides of said piston head and having different cross sectional areas, said adapter means being movable relative to said one end portion of said rod and extending through said one end of said cylinder, and said passage means comprising opening means through said piston head for connecting said spaces.

11. A self centering liquid spring as defined in claim 10 wherein said opening means comprises an orifice in said piston head to damp the movement of said piston head from and towards its centered position.

12. A self centering liquid spring as defined in claim 10 wherein inward movement of said piston rod moves said adapter sleeve inwardly to increase one of said spaces at a lesser rate than said other space decreases and outward movement of said piston rod causing decrease in said one space at a greater rate than said other space increases.

References Cited in the file of this patent

UNITED STATES PATENTS

| | | |
|---|---|---|
| 2,723,847 | Hogan | Nov. 15, 1955 |
| 2,771,968 | Mercier | Nov. 27, 1956 |
| 2,899,194 | Zumwalt | Aug. 11, 1959 |

FOREIGN PATENTS

| | | |
|---|---|---|
| 664,972 | Great Britain | Jan. 16, 1952 |